Oct. 23, 1956 S. E. MAUTNER 2,767,874
SEAL MEANS FOR A RECEPTACLE
Filed July 2, 1952
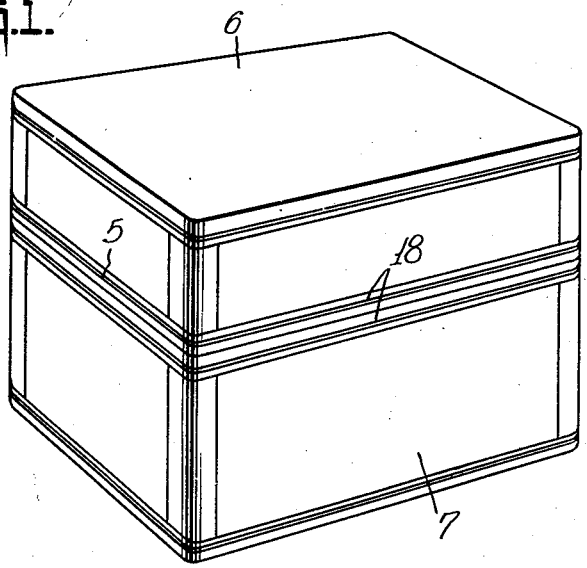
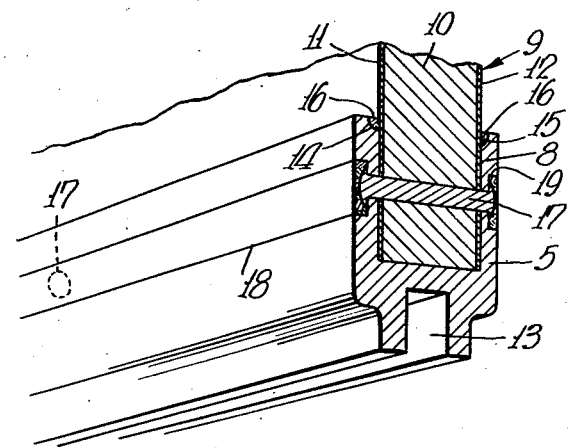
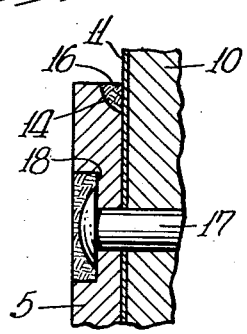
INVENTOR
*Steven Mautner*
BY
*Mitchell Bechert*
ATTORNEYS United States Patent Office 2,767,874
Patented Oct. 23, 1956

2,767,874

SEAL MEANS FOR A RECEPTACLE

Steven E. Mautner, Port Jervis, N. Y., assignor to Skydyne, Inc., Port Jervis, N. Y., a corporation of New York Application July 2, 1952, Serial No. 296,823

1 Claim. (Cl. 217—5)

My invention relates to a receptacle or chest and, more particularly, to sealing means for a chest, to render the same relatively moisture-proof.

Chests or receptacles for shipping fine instruments and other articles, particularly when shipping into the tropics, should be mechanically strong and so well sealed as to be substantially moisture-proof. Chests or receptacles of the character indicated are often subjected to very rough handling in transit, and the chests before approval must often be subjected to very severe tests. Those tests often require dropping on the corners from a substantial height, submerging in water or other liquids for a substantial time, and there are other gruelling tests.

It is a general object of my invention to provide an improved chest of the character indicated, and particularly a seal means for sealing joints so as to render the receptacle or chest substantially moisture-proof, so that the chest when subjected to rough usage will not come apart at joints, and, if the joints loosen slightly, any cracks or openings will tend to be self-sealing.

It is a more specific object to provide improved means for sealing slight openings, especially openings due to looseness of fit of fastening means and the like.

In the drawings, which show, for illustrative purposes only, a preferred form of the invention, Fig. 1 is an isometric view of a chest or receptacle illustrative of one form of the invention;

Fig. 2 is an enlarged fragmentary view in section of a typical joint between a frame member and panel, illustrating improved sealing means; and Fig. 3 is an enlarged fragmentary detail view in section, illustrating parts of Figs. 1 and 2.

In chests or receptacles of the character indicated, the panels forming parts of the chest are often light wood or the like sandwiched between thin metal sheets. Such panels are exceedingly strong and, as long as at least one of the sheets is undamaged, such panels are substantially moisture-proof. Panels as just described are often held in corner or edge frame members, usually light metal extrusions, and are held therein by various means, including rivets, screws, or the like, and any openings through which fastening devices such as rivets must pass are potential points of leakage, particularly after rough handling which may wrench the rivets and the joints between the panels and the extrusions into which they fit. Efforts have been made to seal rivet holes, rivet heads, screw heads and the like so as to prevent leakage of moisture through such openings. Heretofore, as far as I am aware, such seals have been subject to peeling off or to being scraped off in transit, and, if the seal is broken, there is very often a leakage passage for moisture.

In the preferred form of my invention, I not only provide a seal at substantially every point where moisture could enter, but I provide for the application of the seal material in recesses, so that, even with a very substantial seal coating, the sealing material need not project above the surface to which it is applied, and therefore there is little likelihood that the seal will be broken or scraped or peeled off in transit.

In the form shown, the sectional view, Fig. 2, illustrates what might be termed a typical frame member extrusion 5, which specifically forms the bottom rim of the lid section 6 which fits on the main body 7 of the chest. It is to be understood that the section 5 may be simply considered as typical of all of the extrusions used in the chest at the edges where panels come together, and where box and lid sections fit together. The particular extrusion illustrated is a simple one, comprising a long strip having a generally U-shaped channel 8 at one side for the reception of the panel 9, which comprises a core 10 of soft wood or the like sandwiched between protecting sheets 11—12 at the sides. The extrusion may further include a longitudinally extending channel 13 at the side opposite the channel 8, and the channel 13 may receive a rubber or like sealing strip which may be engaged by a male lip or strip on the body section of the case (when the extrusion 5 is carried by the lid). The panel 9 preferably fits quite snugly in the channel 8, and, if desired, sealing compound may be placed in the channel 8 before the panel 9 is fitted and serve to waterproof the joint between the panel 9 and the extrusion 5 or channel 8 therein. As a further seal, my invention contemplates that the inner side or sides of the channel 8 will be chamfered or cut away, as indicated at 14—15, and sealing compound 16 poured or pressed or otherwise applied in the space provided between the panel 9 and the chamfered edges of the channel 8. When the proper sealing compound is applied, it will be seen that it need not extend beyond the surface of the extrusion or of the panel 10, but may be substantially completely housed or protected between the panel and the channel 8. The sealing material used, in accordance with my invention, is preferably of a nature that flows readily, as when heated or dissolved in a volatile solvent, but in the preferred form is of a nature to remain somewhat fluid or plastic so that even if the joints sealed by the sealing material tend to wrench loose the sealing effect of the compound will not be destroyed but the compound will follow along and conform to the wrenched positions and continue to act as a seal.

In order to hold the panel 9 within the channel 8, I provide fastening members such as screws, nails, rivets, or the like 17. The rivets or other fastening devices preferably pass through both legs of the channel 8 and through the panel 9 and may be riveted over or otherwise held against withdrawal, as will be clear. In accordance with my invention, the sealing compound is applied over the heads of the fastening members and to the adjacent parts so as to form a seal, and, in order to protect the seal and compound, I provide depressions which, as shown, are shallow longitudinally extending seal grooves 18—19, and the heads of the fastening members 17 are positioned in such longitudinally extending grooves. The grooves are of ample width to receive the heads of the fastening devices, and the heads are preferably relatively shallow so that they do not project beyond the normal outside surfaces of the extrusion 5 bordering the seal grooves. The sealing material may be flush with the top of the groove— that is, with the sides of the extrusion 5—but preferably the sealing material does not extend beyond the surface of the extrusion, hence there is little likelihood that the sealing material will be torn away or abraded or wrenched loose during handling. As stated, the sealing compound is preferably a material which may be readily flowed or pressed into the grooves so as to seal completely all openings or potential openings at the joints, and which will preferably remain fluid or plastic, to some extent, so as to be self-sealing in case any of the parts should wrench loose.

With all permanent joints sealed, as heretofore described, and the temporary joints, such as between the receptacle and its lid, sealed by means of rubber gaskets and the like, it will be clear that the case or receptacle will be substantially moisture-proof, and in all normal use and transit of the case the joints will remain sealed and the sealing material will be likely to remain in place, and will be so protected that there is little likelihood that it will be broken, torn out, or abraded to an extent sufficient to permit leaks.

While the invention has been described in considerable detail and a preferred form shown, it is to be understood that various changes may be made within the scope of the invention, as defined in the appended claims.

I claim:

In a chest, a frame member having a longitudinally extending channel therein for a panel, a panel in said channel, one of the legs of said channel having an external longitudinal groove therein of a depth to receive the head of a headed fastener, said channel on the inside being substantially smooth and free of obstructions, whereby said panel may pass freely into said channel, headed fasteners extending through the legs of said channel and through the panel therein, the heads of said fasteners being located in said external groove in spaced apart positions, and sealing compound substantially filling said groove and covering the heads of said headed fasteners so as to completely seal said fasteners in said groove, said sealing compound being semi-fluid to flow into and seal any opening which might exist about said fasteners.

References Cited in the file of this patent

UNITED STATES PATENTS

| | | |
|---|---|---|
| 598,827 | Tracy | Feb. 8, 1898 |
| 640,075 | Arnold | Dec. 26, 1899 |
| 1,256,202 | Collins | Feb. 12, 1918 |
| 1,749,337 | Geyer | Mar. 4, 1930 |
| 2,116,846 | Pilcher | May 10, 1938 |
| 2,146,971 | McIlwraith et al. | Feb. 14, 1939 |
| 2,148,858 | Freeman et al. | Feb. 28, 1939 |
| 2,247,330 | Demers | June 24, 1941 |